US008495925B2

(12) United States Patent
Pesola et al.

(10) Patent No.: US 8,495,925 B2
(45) Date of Patent: Jul. 30, 2013

(54) GEARBOX FOR A MOTOR-VEHICLE DOUBLE CLUTCH TRANSMISSION

(75) Inventors: Fabio Pesola, Orbassano (IT); Gianluigi Pregnolato, Orbassano (IT); Andrea Piazza, Orbassano (IT); Marco Garabello, Orbassano (IT); Valter Pastorello, Orbassano (IT)

(73) Assignee: C.R.F. Societa' Consortile per Azioni, Orbassano, Turin (IT)

( * ) Notice: Subject to any disclaimer, the term of this patent is extended or adjusted under 35 U.S.C. 154(b) by 112 days.

(21) Appl. No.: 12/780,675

(22) Filed: May 14, 2010

(65) Prior Publication Data

US 2011/0113909 A1 May 19, 2011

(30) Foreign Application Priority Data

Nov. 13, 2009 (EP) .................................. 09425459

(51) Int. Cl.
*F16H 3/08* (2006.01)
(52) U.S. Cl.
USPC .......................................................... 74/330
(58) Field of Classification Search
USPC ..................... 74/330, 331, 340, 321; 475/332
See application file for complete search history.

(56) References Cited

U.S. PATENT DOCUMENTS

| 7,197,954 | B2* | 4/2007 | Baldascini et al. | 74/331 |
| 7,246,536 | B2* | 7/2007 | Baldwin | 74/340 |
| 7,677,378 | B2* | 3/2010 | Shintani | 192/219.5 |
| 7,752,934 | B2* | 7/2010 | Singh et al. | 74/331 |
| 7,832,299 | B2* | 11/2010 | Kobayashi et al. | 74/330 |
| 8,074,529 | B2* | 12/2011 | Hoffmann | 74/330 |
| 8,152,691 | B2* | 4/2012 | Miller et al. | 477/124 |
| 2005/0130795 | A1 | 6/2005 | Kim et al. | |
| 2007/0277633 | A1* | 12/2007 | Burgardt et al. | 74/331 |
| 2007/0277634 | A1* | 12/2007 | Komori | 74/331 |
| 2007/0289399 | A1* | 12/2007 | Tanba et al. | 74/330 |
| 2009/0173175 | A1* | 7/2009 | Thery | 74/331 |
| 2011/0146445 | A1* | 6/2011 | Silva et al. | 74/665 K |

FOREIGN PATENT DOCUMENTS

| DE | 10 2004 056 936 A1 | 11/2004 |
| EP | 1 975 461 A2 | 10/2008 |

* cited by examiner

*Primary Examiner* — Ha D Ho
*Assistant Examiner* — Jude Agendia
(74) *Attorney, Agent, or Firm* — Merchant & Gould P.C.

(57) ABSTRACT

A gearbox includes two coaxial primary shafts carrying fixed gearwheels acting as driving gearwheels of the gear trains associated with the forward gears and with the reverse gear, a secondary shaft carrying idle gearwheels acting as driven or intermediate gearwheels of the gear trains associated with the forward gears and with the reverse gear and a lay shaft, and a lay shaft carrying a fixed gearwheel acting as parking gearwheel. The lay shaft is permanently cinematically connected to the secondary shaft via a gear train comprising a first fixed gearwheel carried by the lay shaft, a second idle gearwheel coaxial with the two primary shafts and a third fixed gearwheel carried by the secondary shaft, the first and third fixed gearwheels meshing permanently with the second idle gearwheel.

10 Claims, 8 Drawing Sheets

GEARBOX FOR A MOTOR-VEHICLE DOUBLE CLUTCH TRANSMISSION

This application claims the benefit of European Patent Application No. 09425459.6, filed on Nov. 13, 2009 and which application is incorporated herein by reference. A claim of priority to all, to the extent appropriate is made.

BACKGROUND OF THE INVENTION

The present invention relates to a gearbox with at least five forward gears and one reverse gear for use in a motor-vehicle double-clutch transmission.

SUMMARY OF THE INVENTION

It is an object of the present invention to provide a gearbox with at least five forward gears and one reverse gear for a motor-vehicle double-clutch transmission having reduced sizes.

This and other objects are fully achieved according to the present invention by virtue of a gearbox having a pair of coaxial primary shafts, intended to be torsionally coupled each to a drive shaft of the motor vehicle by means of a respective friction clutch of a clutch unit, as well as a secondary shaft and a lay shaft both arranged parallel to the two primary shafts, wherein the two primary shafts carry a plurality of driving gearwheels associated to the forward gears and to the reverse gear, wherein the secondary shaft carries a plurality of driven gearwheels associated to the forward gears and to the reverse gear and a final reduction pinion intended to mesh permanently with an input gearwheel of a differential gear of the motor vehicle, wherein the lay shaft carries a first idle gearwheel acting as driven gearwheel of a first gear train associated to the reverse gear, a second idle gearwheel acting as driven gearwheel of a second gear train associated to one of the forward gears, and a parking gearwheel, and wherein the lay shaft is permanently kinematically connected to the secondary shaft by means of a third gear train comprising a first fixed gearwheel carried by the lay shaft, a second idle gearwheel coaxial with the two primary shafts and a third fixed gearwheel carried by the secondary shaft, the two fixed gearwheels of the third gear train permanently meshing both with the idle gearwheel of that gear train.

BRIEF DESCRIPTION OF THE DRAWINGS

The characteristics and the advantages of the invention will become clear from the detailed description given hereinafter purely by way of non-limiting example with reference to the appended drawings, in which.

DETAILED DESCRIPTION OF THE PREFERRED EMBODIMENTS

Figure 1:
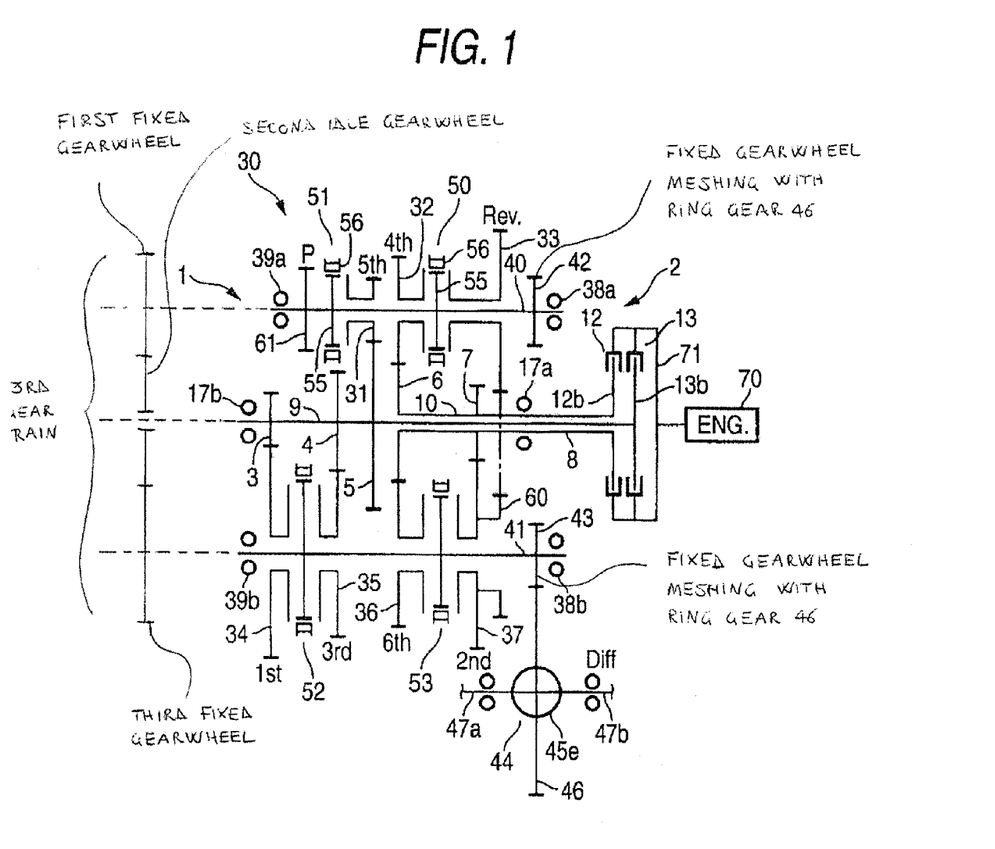
FIG. 1 is a schematic illustration of a gearbox for a motor-vehicle double-clutch transmission with five forward gears and one reverse gear according to the present invention.

With reference first to FIG. 1, a gearbox for a motor-vehicle double-clutch transmission having five forward gears and one reverse gear is generally indicated 10 and comprises:

a first primary shaft 12 intended to be torsionally connected to a drive shaft of the motor vehicle (not shown) by means of a respective first friction clutch (also not shown) of a clutch unit of the transmission;

a second primary shaft 14 intended to be torsionally connected to the drive shaft of the motor vehicle by means of a respective second friction clutch (also not shown) of the clutch unit of the transmission, the second primary shaft 14 being arranged coaxially with the first primary shaft 12, and in particular, according to the illustrated example, outside the first primary shaft 12; and a secondary shaft 16 and a lay shaft 18 both arranged parallel to the two primary shafts 12 and 14.

The first primary shaft 12 (inner primary shaft) projects axially from the second primary shaft 14 (outer primary shaft) and carries, in order from the side axially opposite to the clutch unit of the transmission (left-hand side, relative to the observer of FIG. 1) to the side axially facing the clutch unit of the transmission (right-hand side, relative to the observer of FIG. 1), a gearwheel 20 acting as driving gearwheel for both the gear train of first gear and the gear train of reverse gear, a gearwheel 22 acting as driving gearwheel for the gear train of fifth gear and a gearwheel 24 acting as driving gearwheel for the gear train of third gear. The first primary shaft 12 also carries, at the left-hand end relative to the observer of FIG. 1, an idle gearwheel 26 acting as intermediate gearwheel of a gear train which kinematically connects the lay shaft 18 to the secondary shaft 16, as will be further explained in the following part of the description. The second primary shaft 14 carries, in order from left to right relative to the observer of FIG. 1, a gearwheel 28 acting as driving gearwheel for the gear train of fourth gear and a gearwheel 30 acting as driving gearwheel for the gear train of second gear. The driving gearwheels 20, 22, 24, 28 and 30 mentioned above are made as fixed gearwheels, i.e. as gearwheels permanently fast for rotation with the respective shafts.

The secondary shaft 16 carries, at the end axially opposite to the clutch unit, a gearwheel 32 which is made as a fixed gearwheel and permanently meshes with the idle gearwheel 26 of the first primary shaft 12 and, at the end axially facing the clutch unit, a final reduction pinion 34 intended to mesh permanently with an input gearwheel or ring gear of a differential gear of the motor vehicle (not shown). The secondary shaft 16 also carries between the gearwheel 32 and the final reduction pinion 34, in order from left to right relative to the observer of FIG. 1, a gearwheel 36 permanently meshing with the driving gearwheel 20 and acting as driven gearwheel of the gear train of first gear, a gearwheel 38 permanently meshing with the driving gearwheel 22 and acting as driven gearwheel of the gear train of fifth gear, a gearwheel 40 permanently meshing with the driving gearwheel 28 and acting as driven gearwheel of the gear train of fourth gear, and a gearwheel 42 permanently meshing with the driving gearwheel 30 and acting as driven gearwheel of the gear train of second gear. The driven gearwheels 36, 38, 40 and 42 mentioned above are made as idle gearwheels and are selectively connectable for rotation with the secondary shaft 16 by means of a pair of sliding engagement sleeves 44 and 46. More precisely, the sliding engagement sleeve 44 is interposed between the gearwheels 36 and 38 and is selectively movable to the left or to the right to connect the gearwheel 36 or the gearwheel 38, respectively, for rotation with the secondary shaft 16, thereby engaging the first gear or the fifth gear, respectively, whereas the sliding engagement sleeve 46 is interposed between the gearwheels 40 and 42 and is selectively movable to the left or to the right to connect the gearwheel 40 or the gearwheel 42, respectively, for rotation with the secondary shaft 16, thereby engaging the fourth gear or the second gear, respectively.

The lay shaft 18 carries, at the end axially opposite to the clutch unit, a gearwheel 48 which is made as fixed gearwheel and permanently meshes with the idle gearwheel 26 of the first primary shaft 12, in such a manner that the lay shaft 18 is permanently kinematically connected with the secondary shaft 16 by means of the gear train formed by the gearwheel 48 which is fast for rotation with the lay shaft 18, by the idle gearwheel 26 which is coaxial to the first primary shaft 12 and by the gearwheel 32 which is fast for rotation with the secondary shaft 16. The lay shaft 18 also carries, in order from left to right relative to the observer of FIG. 1, a gearwheel 50 permanently meshing with the gearwheel 36 carried by the secondary shaft 16 and acting as intermediate gearwheel of the gear train of reverse gear, a gearwheel 52 permanently meshing with the driving gearwheel 24 carried by the first primary shaft 12 and acting as intermediate gearwheel of the gear train of third gear and a gearwheel 54 acting as parking gearwheel. The intermediate gearwheels 50 and 52 mentioned above are made as idle gearwheels, whereas the parking gearwheel 54 is made as fixed gearwheel. A sliding engagement sleeve 56 is interposed between the gearwheels 50 and 52 and is selectively movable to the left or to the right to connect the gearwheel 50 or the gearwheel 52, respectively, for rotation with the lay shaft 18, thereby engaging the reverse gear or the third gear, respectively.

Therefore, the transmission of the torque both with reverse gear engaged and with at least one of the forward gears (in the present case the third gear) engaged takes place via the lay shaft 18. More specifically, with the reverse gear engaged (sliding engagement sleeve 56 in the left-hand shift position), the torque is transmitted from the first primary shaft 12 to the lay shaft 18 via the gear train formed by the gearwheel 20 carried by the primary shaft 12 and acting as driving gearwheel, by the gearwheel 36 carried by the secondary shaft 16 and acting as idle gearwheel, and by the gearwheel 50 carried by the lay shaft 18 and acting as driven gearwheel, and then from the lay shaft 18 to the secondary shaft 16 via the gear train formed by the gearwheel 48 carried by the lay shaft 18 and acting as driving gearwheel, by the gearwheel 26 carried by the first primary shaft 12 and acting as idle gearwheel, and by the gearwheel 32 carried by the secondary shaft 16 and acting as driven gearwheel. With the third gear engaged (sliding engagement sleeve 56 in the right-hand shift position), the torque is transmitted from the first primary shaft 12 to the lay shaft 18 via the gear train formed by the gearwheel 24 carried by the primary shaft 12 and acting as driving gearwheel, and by the gearwheel 52 carried by the lay shaft 18 and acting as driven gearwheel, and then from the lay shaft 18 to the secondary shaft 16 via the above-described gear train formed by the gearwheels 48, 26 and 32.

The gearbox described above with reference to FIG. 1 enables to carry out all the single gear shifts in so-called powershift mode, i.e. with simultaneous engagement of the old and new gears, apart from the gear shift from the first gear to the reverse gear and vice versa, since all the driving gearwheels associated to the odd gears (first, third and fifth gears) are carried by the one primary shaft (in the present case the first primary shaft 12), whereas all the driving gearwheels associated to the even gears (second and fourth gears) are carried by the other primary shaft (in the present case the second primary shaft 14). Moreover, the use of a lay shaft carrying the intermediate gearwheels of the gear trains implementing the reverse gear and one of the forward gears (in the present case the third gear) makes it possible to limit the axial sizes of the gearbox with respect to a gearbox architecture having only one secondary shaft and no lay shaft. Moreover, the mounting of the parking gearwheel on the lay shaft makes it possible to reduce the actuation forces of the parking device.

Figure 2:
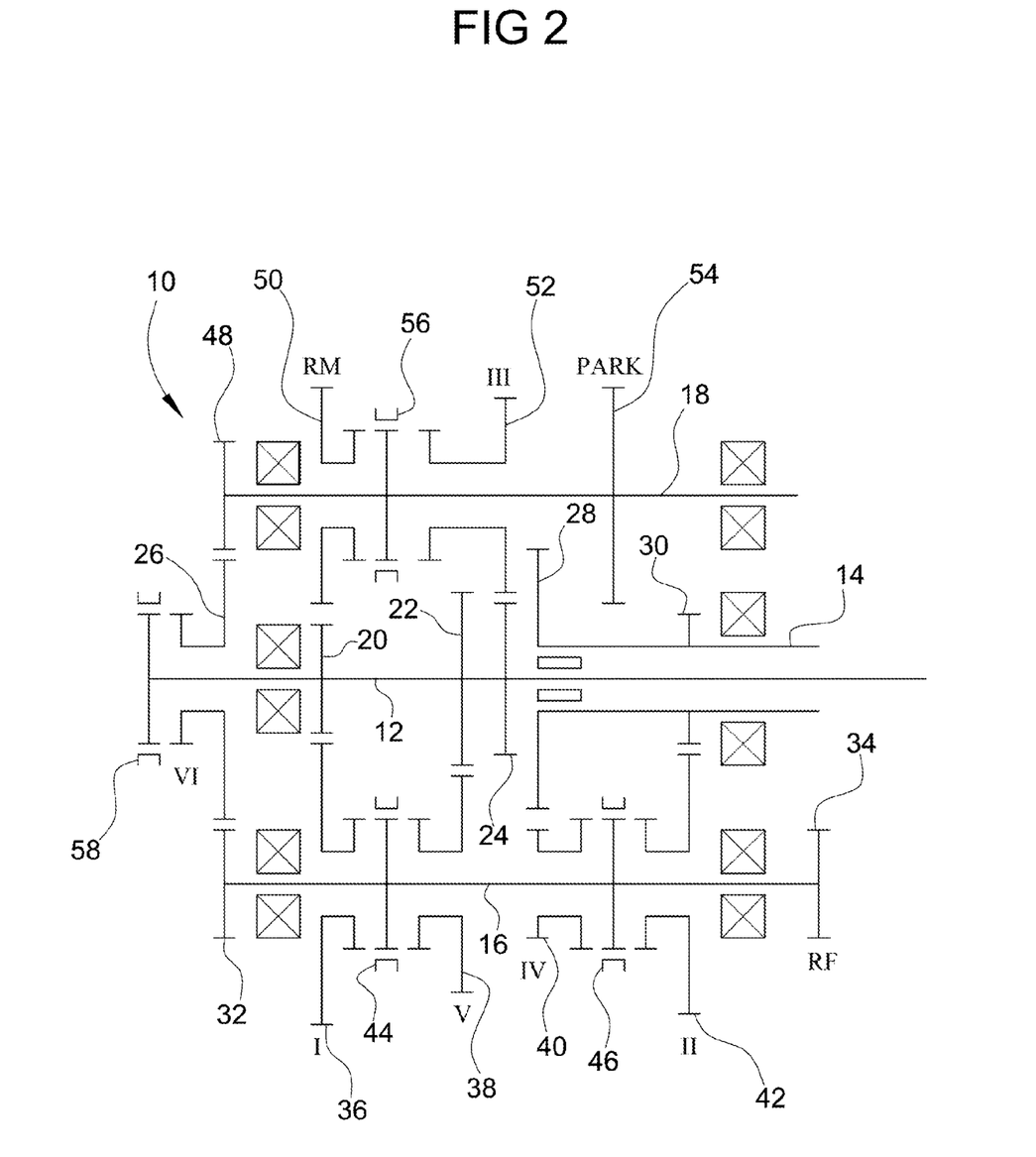
FIG. 2 is a schematic illustration of a gearbox for a motor-vehicle double-clutch transmission with six forward gears and one reverse gear according to the present invention.

A further embodiment of a gearbox for a motor-vehicle double-clutch transmission according to the present invention is illustrated in FIG. 2, where parts and elements identical or similar to those of FIG. 1 have been given the same reference numerals.

The gearbox of FIG. 2 is a gearbox with six forward gears and one reverse gear which also comprises a pair of primary shafts 12 and 14, a secondary shaft 16 and a lay shaft 18, and in which the arrangement of the gearwheels associated to the first five forward gears and to the reverse gear is identical to that of the gearbox of FIG. 1, and therefore reference is made to the above detailed description of that gearbox. The sixth gear is obtained by adding a sliding engagement sleeve 58 associated to the gearwheel 26 to connect it for rotation with the first primary shaft 12. In this way, when the sliding engagement sleeve 58 is operated to connect the gearwheel 26 for rotation with the first primary shaft 12, the torque is transmitted directly from the first primary shaft 12 to the secondary shaft 16 via the gear train formed by the gearwheel 26 acting as driving gearwheel and by the gearwheel 32 acting as driven gearwheel.

The gearbox according to FIG. 2 offers the same advantages mentioned above with reference to the gearbox of FIG. 1, with the difference that in the present case the gear shift from the fifth gear to the sixth gear, and vice versa, is not allowed in powershift mode, whereas the gear shift from the sixth gear to the fourth or second gear (the so-called kickdown) is allowed in powershift mode.

Figure 3:
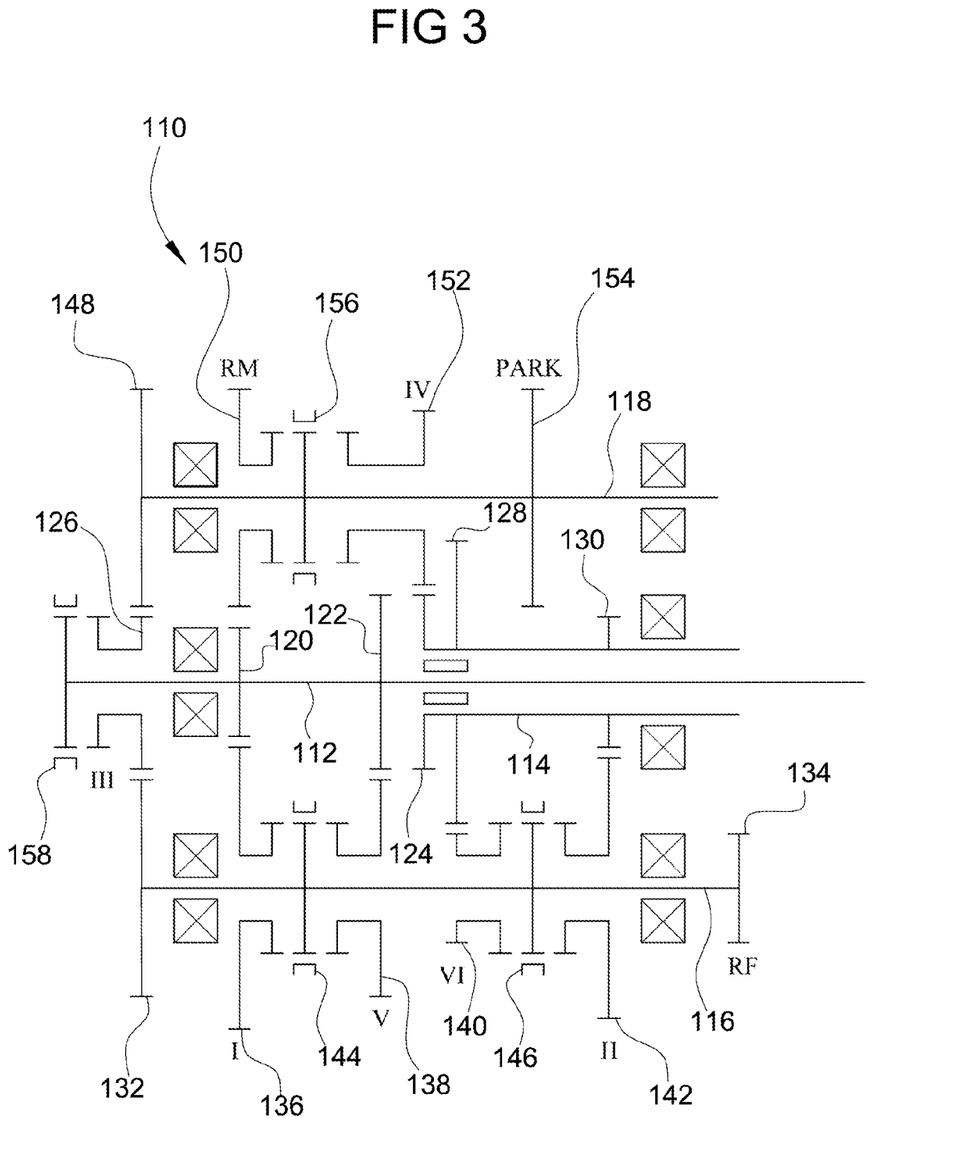
FIG. 3 is a schematic illustration of a gearbox for a motor-vehicle double-clutch transmission with six forward gears and one reverse gear according to the present invention, which differs from the gearbox of FIG. 2 in the arrangement of the gearwheels forming the gear trains associated to the various gears.

A further embodiment of a gearbox for a motor-vehicle double-clutch transmission with six forward gears and one reverse gear according to the present invention is illustrated in FIG. 3, where parts and elements identical or similar to those of FIG. 2 have been given the same reference numerals, increased by 100.

With reference to FIG. 3, the gearbox is generally indicated 110 and also comprises a first primary shaft 112 (inner primary shaft), a second primary shaft 114 (outer primary shaft), a secondary shaft 116 and a lay shaft 118.

The first primary shaft 112 projects axially from the second primary shaft 114 and carries, in order from left to right relative to the observer of FIG. 3, an idle gearwheel 126 acting both as intermediate gearwheel of a gear train which kinematically connects the lay shaft 118 to the secondary shaft 116, and as driving gearwheel for the gear train of third gear, a gearwheel 120 acting as driving gearwheel both for the gear train of first gear and for the gear train of reverse gear, and a gearwheel 122 acting as driving gearwheel for the gear train of fifth gear. The second primary shaft 114 carries, in order from left to right relative to the observer of FIG. 3, a gearwheel 124 acting as driving gearwheel for the gear train of fourth gear, a gearwheel 128 acting as driving gearwheel for the gear train of sixth gear and a gearwheel 130 acting as driving gearwheel for the gear train of second gear. The above-mentioned driving gearwheels 120, 122, 124, 128 and 130 are made as fixed gearwheels, i.e. they are permanently fast for rotation with the respective shafts.

The secondary shaft 116 carries, at the end axially opposite to the clutch unit, a gearwheel 132 which is made as fixed gearwheel and permanently meshes with the idle gearwheel 126 of the first primary shaft 112 and, at the end axially facing the clutch unit, a final reduction pinion 134 intended to mesh permanently with an input gearwheel or ring gear of the differential gear of the motor vehicle (not shown). The secondary shaft 116 also carries between the gearwheel 132 and the final reduction pinion 134, in order from left to right relative to the observer of FIG. 3, a gearwheel 136 permanently meshing with the driving gearwheel 120 and acting as driven gearwheel of the gear train of first gear, a gearwheel 138 permanently meshing with the driving gearwheel 122 and acting as driven gearwheel of the gear train of fifth gear, a gearwheel 140 permanently meshing with the driving gearwheel 128 and acting as driven gearwheel of the gear train of sixth gear, and a gearwheel 142 permanently meshing with the driving gearwheel 130 and acting as driven gearwheel of the gear train of second gear. The above-mentioned driven gearwheels 136, 138, 140 and 142 are made as idle gearwheels and are selectively connectable for rotation with the secondary shaft 116 by means of a pair of sliding engagement sleeves 144 and 146. More specifically, the sliding engagement sleeve 144 is interposed between the gearwheels 136 and 138 and is selectively movable to the left or to the right to connect the gearwheel 136 or the gearwheel 138, respectively, for rotation with the secondary shaft 116, thereby engaging the first gear or the fifth gear, respectively, whereas the sliding engagement sleeve 146 is interposed between the gearwheels 140 and 142 and is selectively movable to the left or to the right to connect the gearwheel 140 or the gearwheel 142, respectively, for rotation with the secondary shaft 116, thereby engaging the sixth gear or the second gear, respectively.

The lay shaft 118 carries, at the end axially opposite to the clutch unit, a gearwheel 148 which is made as fixed gearwheel and permanently meshes with the idle gearwheel 126 of the first primary shaft 112, in such a manner that the lay shaft 118 is permanently kinematically connected with the secondary shaft 116 by means of the gear train formed by the gearwheel 148 which is fast for rotation with the lay shaft 118, by the idle gearwheel 126 which is coaxial with the first primary shaft 112 and by the gearwheel 132 which is fast for rotation with the secondary shaft 116. The lay shaft 118 also carries, in order from left to right relative to the observer of FIG. 3, a gearwheel 150 permanently meshing with the gearwheel 136 carried by the secondary shaft 116 and acting as intermediate gearwheel of the gear train of reverse gear, a gearwheel 152 permanently meshing with the driving gearwheel 124 carried by the second primary shaft 114 and acting as intermediate gearwheel of the gear train of fourth gear and a gearwheel 154 acting as parking gearwheel.

The above-mentioned intermediate gearwheels 150 and 152 are made as idle gearwheels, whereas the parking gearwheel 154 is made as fixed gearwheel. A sliding engagement sleeve 156 is interposed between the gearwheels 150 and 152 and is selectively movable to the left or to the right to connect the gearwheel 150 or the gearwheel 152, respectively, for rotation with the lay shaft 118, thereby engaging the reverse gear or the fourth gear, respectively.

With respect to the gearbox of FIG. 2, the forward gear corresponding to the transmission of the torque via the lay shaft 118 is therefore the fourth gear, instead of the third gear. Moreover, the gear obtained by connecting the idle gearwheel 126 for rotation with the first primary shaft by means of the sliding engagement sleeve 158 is the third gear, instead of the sixth gear. Moreover, like the gearbox of FIG. 1, also the gearbox of FIG. 3 makes it possible to carry out all the single gear shifts in powershift mode, apart from the gear shift from the first gear to the reverse gear and vice versa, since all the driving gearwheels associated to the odd gears (first, third and fifth gears) are carried by the one primary shaft (also in this case the first primary shaft 112), whereas all the driving gearwheels associated to the even gears (second, fourth and sixth gears) are carried by the other primary shaft (second primary shaft 114). Also the embodiment of FIG. 3 offers the same advantages described above in terms of limited axial sizes of the gearbox and of reduced actuation forces of the parking device.

Figure 4:
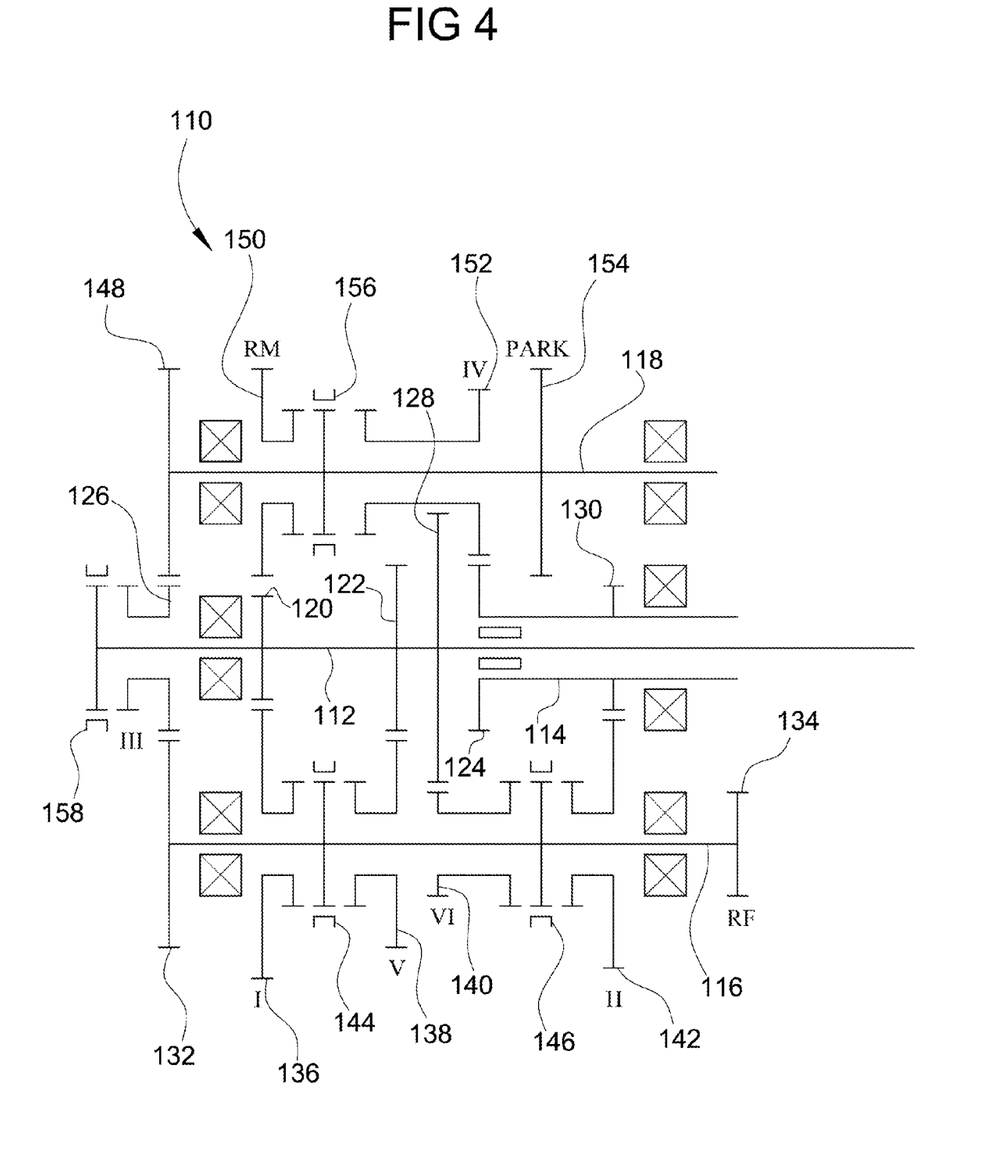
FIG. 4 is a schematic illustration of a gearbox for a motor-vehicle double-clutch transmission with six forward gears and one reverse gear according to the present invention, which differs from the gearbox of FIGS. 2 and 3 in the arrangement of the gearwheels forming the gear trains associated to the various gears.
Figure 5:
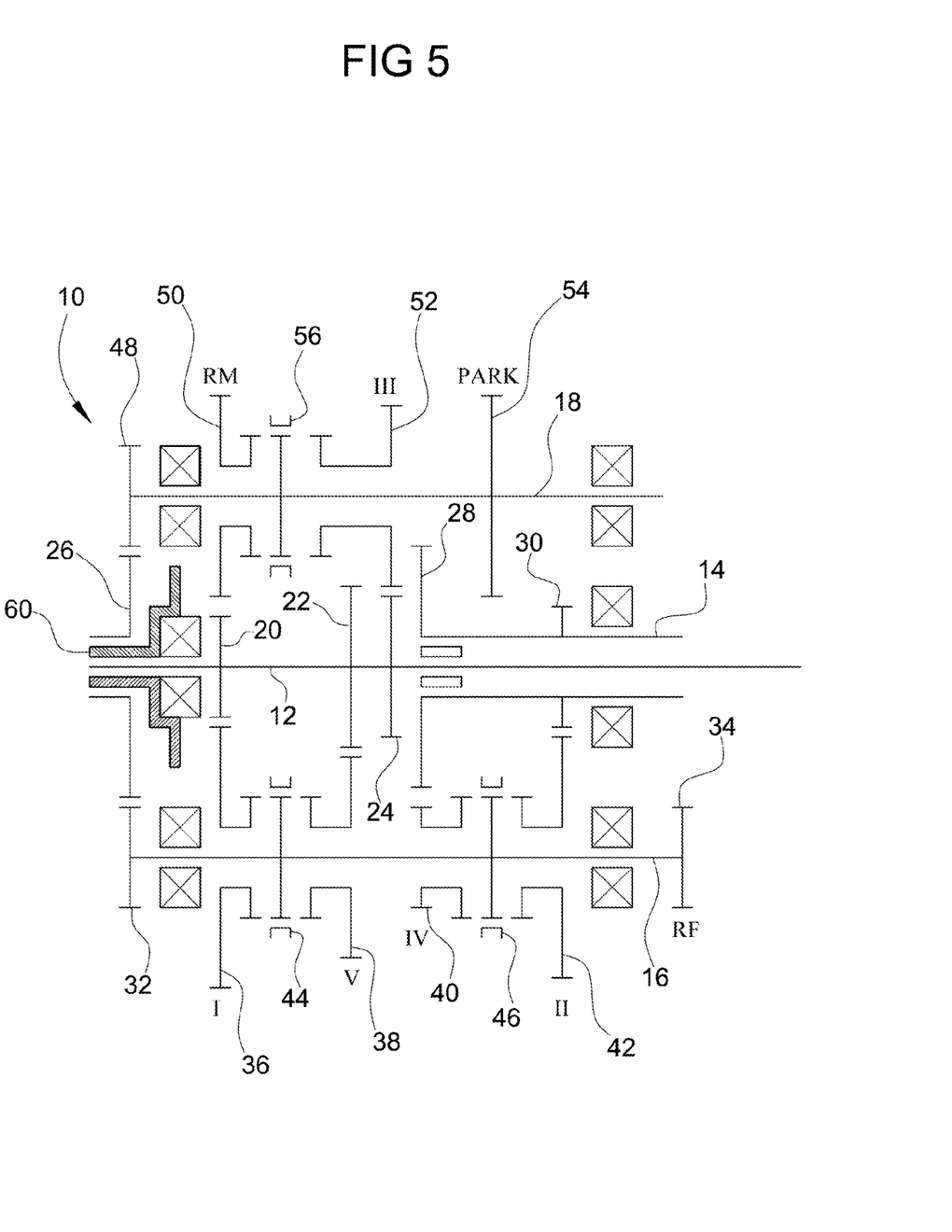
FIG. 5 is a schematic illustration of a gearbox for a motor-vehicle double-clutch transmission with five forward gears and one reverse gear in which the arrangement of the gearwheels forming the gear trains associated to the various gears is similar to that of the gearbox of FIG. 1, but differs therefrom in the way of supporting the idle gearwheel of the gear train which kinematically connects the lay shaft to the secondary shaft.
Figure 6:
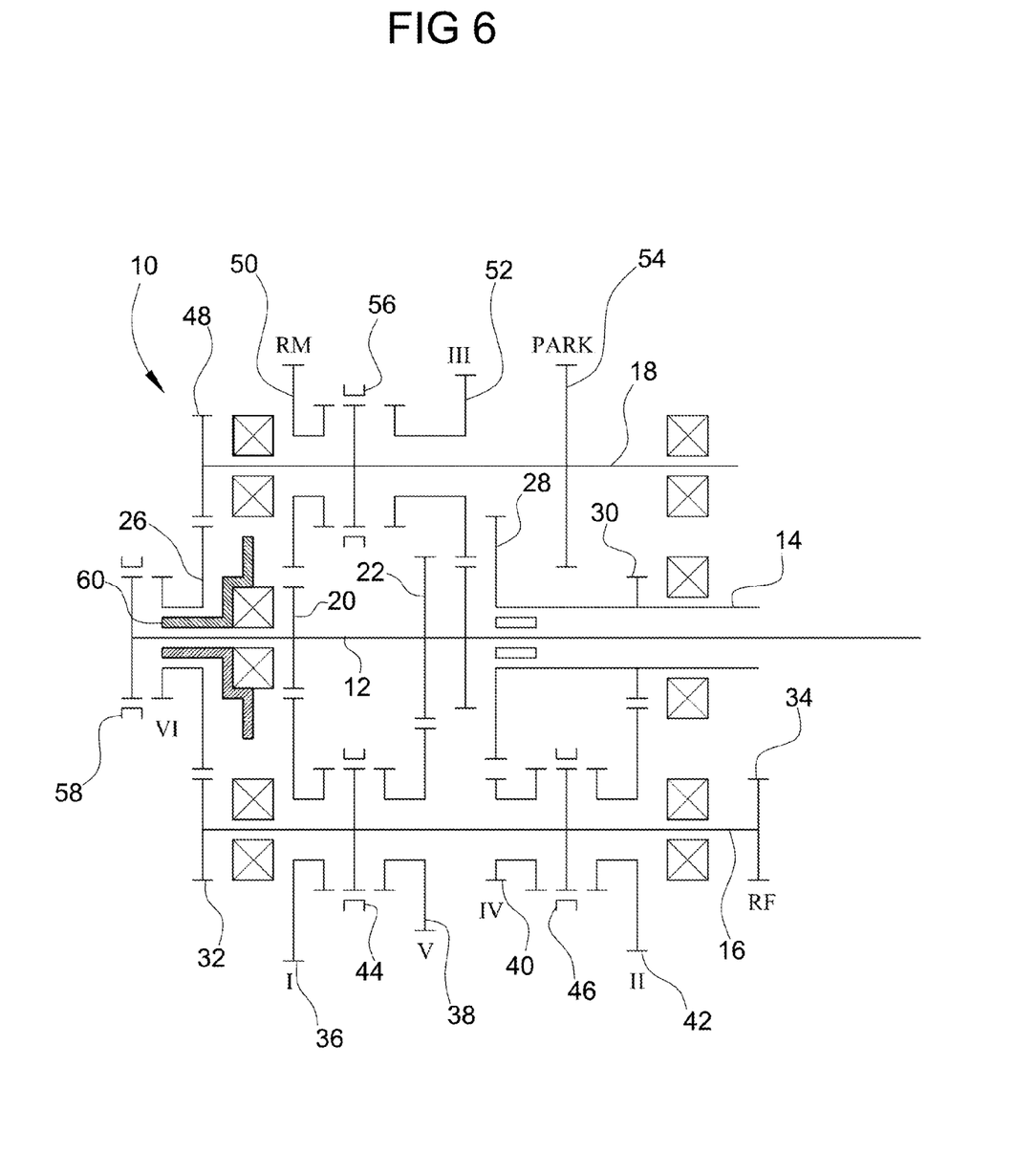
FIG. 6 is a schematic illustration of a gearbox for a motor-vehicle double-clutch transmission with six forward gears and one reverse gear in which the arrangement of the gearwheels forming the gear trains associated to the various gears is similar to that of the gearbox of FIG. 2, but differs therefrom in the way of supporting the idle gearwheel of the gear train which kinematically connects the lay shaft to the secondary shaft.
Figure 7:
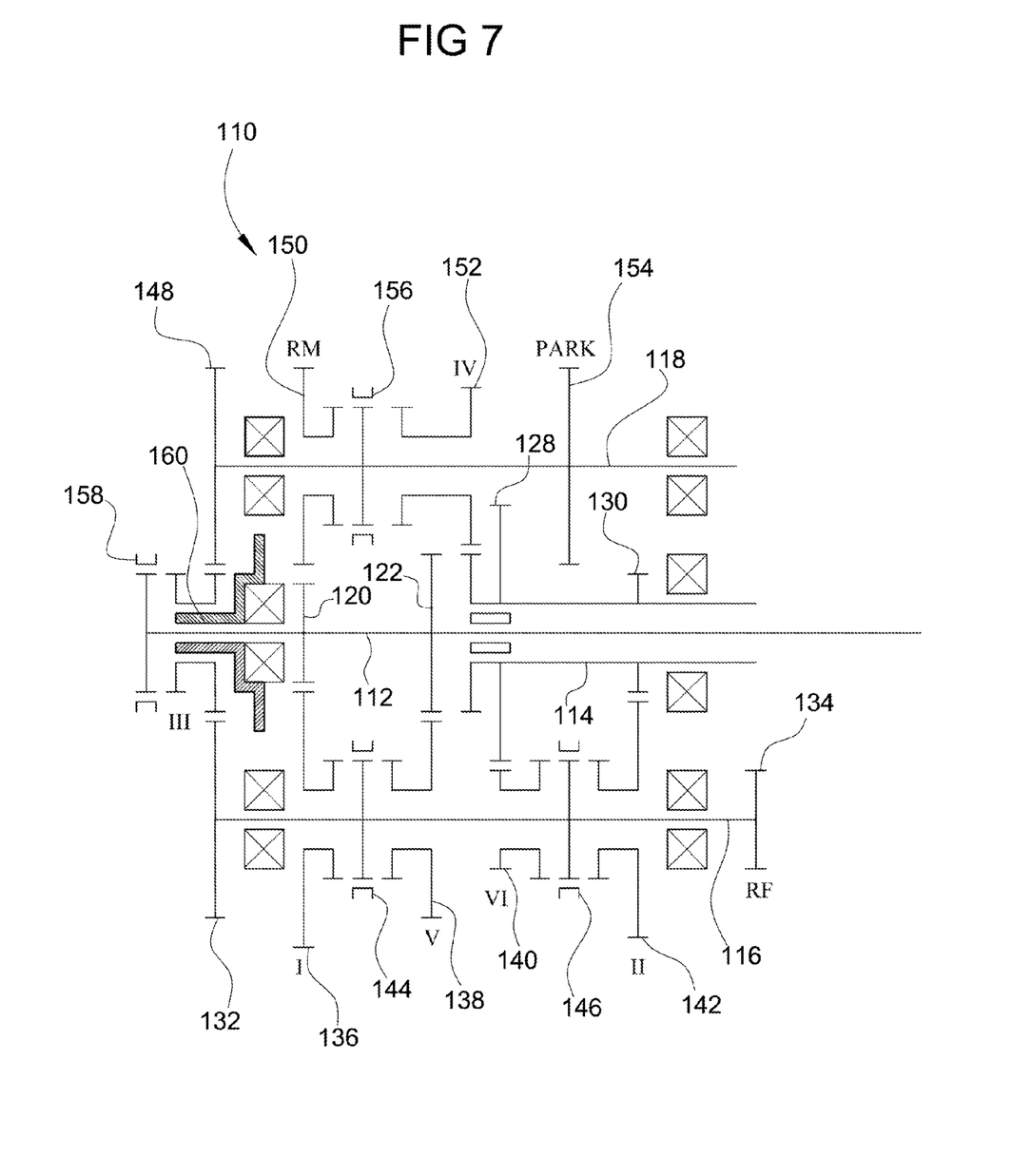
FIG. 7 is a schematic illustration of a gearbox for a motor-vehicle double-clutch transmission with six forward gears and one reverse gear in which the arrangement of the gearwheels forming the gear trains associated to the various gears is similar to that of the gearbox of FIG. 3, but differs therefrom in the way of supporting the idle gearwheel of the gear train which kinematically connects the lay shaft to the secondary shaft.
Figure 8:
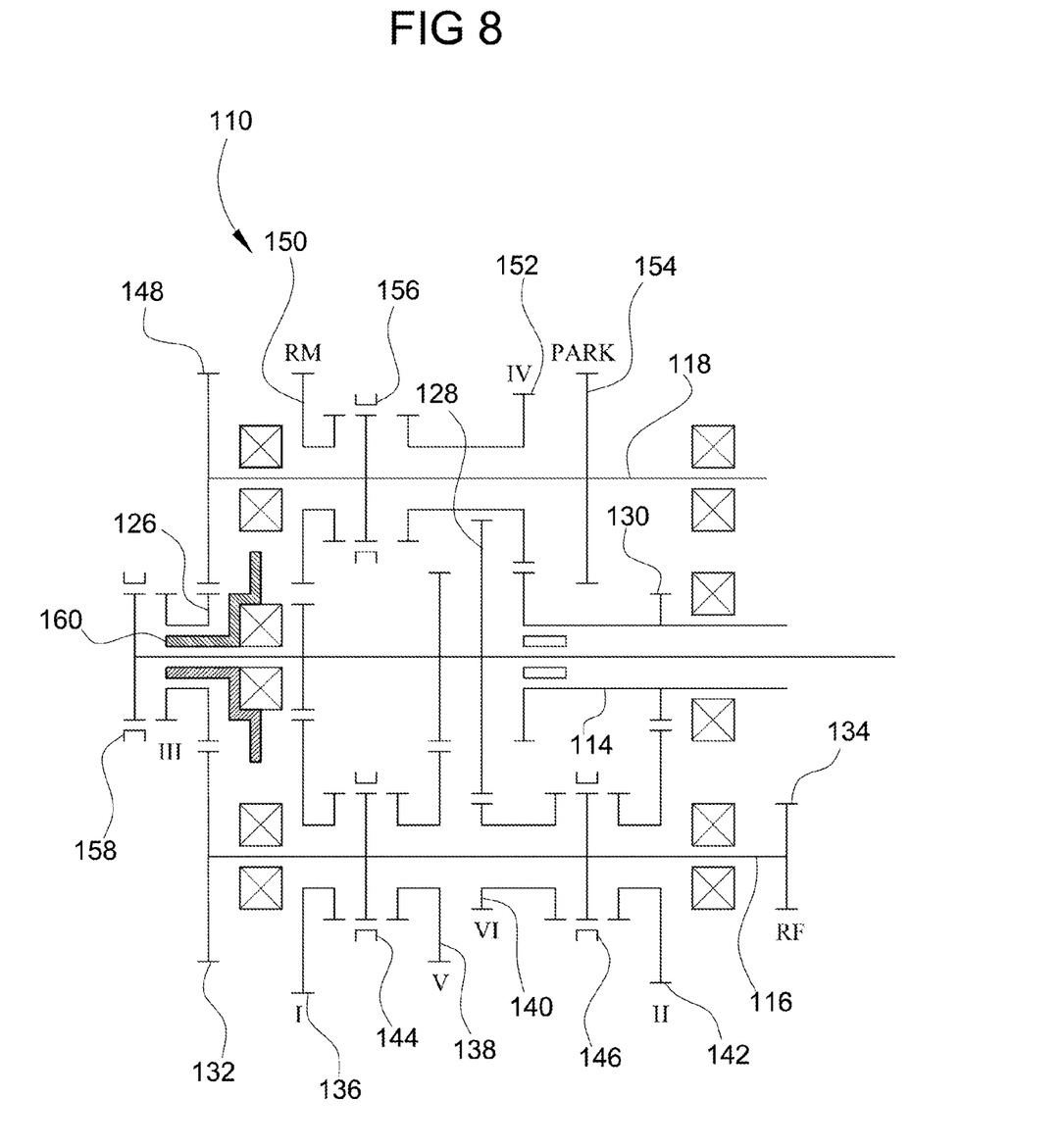
FIG. 8 is a schematic illustration of a gearbox for a motor-vehicle double-clutch transmission with six forward gears and one reverse gear in which the arrangement of the gearwheels forming the gear trains associated to the various gears is similar to that of the gearbox of FIG. 4, but differs therefrom in the way of supporting the idle gearwheel of the gear train which kinematically connects the lay shaft to the secondary shaft.

A further embodiment of a gearbox for a motor-vehicle double-clutch transmission with six forward gears and one reverse gear according to the present invention is illustrated in FIG. 4, where parts and elements identical or similar to those of FIG. 3 have been given the same reference numerals.

The gearbox of FIG. 4 also comprises a pair of primary shafts 112 and 114, a secondary shaft 116 and a lay shaft 118 and has an arrangement of the gearwheels associated to the six forward gears and to the reverse gear which is identical to that of the gearbox of FIG. 3, the only difference being that the driving gearwheel 128 permanently meshing with the driven gearwheel 140 carried by the secondary shaft 116 to implement the sixth gear is in this case carried by the first primary shaft 112, instead of the second primary shaft 114, and specifically on the right (according to the point of view of the observer of FIG. 4) of the driving gearwheel 122. Accordingly, the gearbox according to FIG. 4 does not allow to shift from the fifth gear to the sixth gear and vice versa in powershift mode, but allows anyway to shift from the sixth gear to the fourth or second gear in powershift mode during a kick-down manoeuvre.

The embodiments of the gearbox according to the present invention illustrated in FIGS. 5 to 8 have the same arrangement of the gear as the embodiments described above with reference to FIGS. 1 to 4 (the embodiment of FIG. 5 corresponding to that of FIG. 1, the embodiment of FIG. 6 corresponding to that of FIG. 2, the embodiment of FIG. 7 corresponding to that of FIG. 3, and the embodiment of FIG. 8 corresponding to that of FIG. 4), and differ therefrom only in the way the idle gearwheel arranged coaxially to the first primary shaft and acting as intermediate wheel of the gear train which kinematically connects the lay shaft to the secondary shaft is supported for rotation. More specifically, whereas in the embodiments of FIGS. 1 to 4 that gearwheel (indicated 26 in FIGS. 1 and 2 and 126 in FIGS. 3 and 4) is supported for rotation directly on the first primary shaft (indicated 12 in FIGS. 1 and 2 and 112 in FIGS. 3 and 4), for instance by means of a needle bearing (not shown), in the embodiments of FIGS. 5 to 8 that gearwheel (indicated 26 in FIGS. 5 and 6 and 126 in FIGS. 7 and 8) is supported for rotation on a special ring support element (indicated 60 in FIGS. 5 and 6 and 160 in FIGS. 7 and 8) directly formed by the gear case or made as a separate piece from the gear case and attached thereto.

Apart from that, the above description relating to the embodiments of FIGS. 1 to 4 fully applies.

Naturally, the principle of the invention remaining unchanged, the embodiments and manufacturing details may be widely varied with respect to those described and illustrated purely by way of non-limiting example.

The invention claimed is:

1. A gearbox with at least five forward gears and one reverse gear for a motor-vehicle double-clutch transmission, the gearbox comprising:
   two primary shafts coaxial with each other, and one secondary shaft and one lay shaft, the secondary shaft and the lay shaft being arranged parallel to the two primary shafts,
   a plurality of fixed gearwheels carried by the two primary shafts and acting as driving gearwheels for gear trains associated with the forward gears and with the reverse gear,
   a plurality of idle gearwheels carried by the secondary shaft and acting as driven or intermediate gearwheels for gear trains associated with the forward gears and with the reverse gear, and a final reduction pinion carried by the secondary shaft,
   a first idle gearwheel carried by the lay shaft and acting as driven gearwheel for a first gear train associated with the reverse gear, a second idle gearwheel carried by the lay shaft and acting as a driven gearwheel for a second gear train associated with one of the forward gears, and a fixed gearwheel carried by the lay shaft and acting as a parking gearwheel; and
   wherein the lay shaft is permanently kinematically connected to the secondary shaft via a third gear train comprising a first fixed gearwheel carried by the lay shaft, a second idle gearwheel coaxial with the two primary shafts and a third fixed gearwheel carried by the secondary shaft, the two fixed gearwheels of the third gear train meshing permanently both with the idle gearwheel of said third gear train.

2. A gearbox according to claim 1, wherein the lay shaft also carries a sliding engagement sleeve interposed between the first and second idle gearwheels carried by the lay shaft and is selectively operable to connect either of said idle gearwheels for rotation with the lay shaft.

3. A gearbox according to claim 1, wherein said plurality of idle gearwheels carried by the secondary shaft comprises in order a first gearwheel acting both as a driven gearwheel for a gear train of the first forward gear, and as an intermediate gearwheel for said first gear train associated to the reverse gear, a second gearwheel acting as driven gearwheel for a gear train of the fifth forward gear, a third gearwheel acting as driven gearwheel for a gear train of the fourth forward gear, a fourth gearwheel acting as driven gearwheel for a gear train of the second forward gear, a first sliding engagement sleeve interposed between the first and second gearwheels and selectively operable to connect either of said gearwheels for rotation with the secondary shaft, and a second sliding engagement sleeve interposed between the third and fourth gearwheels and selectively operable to connect either of said gearwheels for rotation with the secondary shaft.

4. Gearbox according to claim 3, wherein said plurality of fixed gearwheels carried by the two primary shafts comprises a first driving gearwheel permanently meshing with the first idle gearwheel carried by the secondary shaft to form the gear train of the first forward gear, a second driving gearwheel permanently meshing with the second idle gearwheel carried by the secondary shaft to form the gear train of the fifth forward gear, a third driving gearwheel permanently meshing with the second idle gearwheel carried by the lay shaft to form the second gear train, a fourth driving gearwheel permanently meshing with the third idle gearwheel carried by the secondary shaft to form the gear train of the fourth forward gear, and a fifth driving gearwheel permanently meshing with the fourth idle gearwheel carried by the secondary shaft to form the gear train of the second forward gear, wherein the first, second and third driving gearwheels are carried by the first primary shaft, wherein the fourth and fifth driving gearwheels are carried by the second primary shaft, and wherein the second gear train is associated to the third forward gear.

5. Gearbox according to claim 4, further comprising a sliding engagement sleeve operable to connect the second idle gearwheel of the third gear train for rotation with the first primary shaft, to obtain a gear train of the sixth forward gear formed by the second idle gearwheel acting as a driving gearwheel and by the third fixed gearwheel of the third gear train acting as a driven gearwheel.

6. Gearbox according to claim 3, wherein said third idle gearwheel carried by the secondary shaft acts as a driven gearwheel for the gear train of the sixth forward gear, wherein said plurality of fixed gearwheels carried by the two primary shafts comprises a first driving gearwheel permanently meshing with the first idle gearwheel carried by the secondary shaft to form the gear train of the first forward gear, a second driving gearwheel permanently meshing with the second idle gearwheel carried by the secondary shaft to form the gear train of the fifth forward gear, a third driving gearwheel permanently meshing with the second idle gearwheel carried by the lay shaft to form the second gear train, a fourth driving gearwheel permanently meshing with the third idle gearwheel carried by the secondary shaft to form the gear train of the sixth forward gear, and a fifth driving gearwheel permanently meshing with the fourth idle gearwheel carried by the secondary shaft to form the gear train of the second forward gear, wherein the first and second driving gearwheels are carried by the first primary shaft, wherein the third and fifth driving gearwheels are carried by the second primary shaft, wherein the second gear train is associated to the fourth forward gear, and wherein the gearbox further comprises a sliding engagement sleeve operable to connect the second idle gearwheel of the third gear train for rotation with the first primary shaft, to obtain a gear train of the third forward gear formed by the second idle gearwheel acting as a driving gearwheel and by the third fixed gearwheel of the third gear train acting as a driven gearwheel.

7. Gearbox according to claim 6, wherein the fourth driving gearwheel is carried by the second primary shaft.

8. Gearbox according to claim 6, wherein the fourth driving gearwheel is carried by the first primary shaft.

9. Gearbox according to claim 1, wherein the second idle gearwheel of the third gear train is carried by the first primary shaft.

10. Gearbox according to claim 1, wherein the gearbox comprises a case and wherein the second idle gearwheel of the third gear train is carried by a ring support element directly formed by the case or made as a separate piece from the case and attached to the case.

* * * * *